United States Patent Office 2,798,855
Patented July 9, 1957

---

2,798,855

STERILIZATION INDICATOR

John G. Hainsworth, Pasadena, Calif., assignor to Don Baxter, Inc., Glendale, Calif., a corporation of Nevada No Drawing. Application March 19, 1954,
Serial No. 417,491

20 Claims. (Cl. 252—408)

This invention relates to an indicator designed to undergo a color change on being heated to a sterilization temperature in the presence of steam.

It is a general object of the present invention to provide a sterilization indicator which is designed to function only in the presence of both heat and moisture.

For the purpose of indicating steam sterilization it is desired that an indicator be provided which changes color only in the presence of moisture at sterilizing temperatures. It is, therefore, one of the objects of the present invention to provide an indicator which will not undergo its characteristic change of color if merely heated in dry air.

Primarily the present invention depends upon the coupling of paraphenylenediamine or substituted p-phenylenediamines when oxidized under certain conditions with substances containing active methylene groups to give a dye of the class known as azomethine dyes. The reaction produces blue or blue-green dyes with naphthols and phenols, magenta dyes with pyrazolones, and yellow dyes with acetoacetic ester derivatives. Dyes of this type are used in the field of color photography.

Azomethine dyes may be defined by the general formula

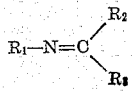

where $R_1$ is a substituted phenylene group. Likewise an "active methylene group" contains two hydrogen atoms adjacent appropriate activating structures. The activating structures include carbonyl groups, as in acetoacetic ester and pyrazolone, and para substituted rings, as in naphthol.

Some of these dye reactions have been found useful for the production of steam sterilization indicators because they proceed more rapidly in the presence than in the absence of water. By combining the ingredients required in the reaction for producing these azomethine dyes with the proper vehicle, I have found it is possible to produce a coating or paint in which the dye formation will occur during steam sterilization.

The vehicle employed in the sterilization indicator of the present invention not only serves as a spreading agent and an agent for bonding the desired indicator coating to a surface, but the vehicle also provides a means by which the response of the indicator to the moisture present is regulated or controlled in order that the dye formation will occur simultaneously with the proper steam sterilization conditions.

For the production of a proper sterilization indicator it is necessary that a vehicle having the proper rate of adsorption of moisture be utilized.

The atmosphere inside a steam autoclave during sterilization appears to be an oxidizing one. This oxidizes the p-phenylenediamines or substituted p-phenylenediamine. The oxidized material then undergoes a coupling reaction which yields an azomethine dye.

Vehicles which may be employed include acrylic, nitrocellulose, polyvinyl and other natural and synthetic resins which do not react with the dye forming ingredients.

Some of the phenylenediamines useful in the present invention comprise: p-phenylenediamine, N,N-diethyl-p-phenylenediamine, N-methyl-p-phenylenediamine, N,N-di - methyl - p - phenylenediamine, N - ethyl - N - hydroxyethyl-p-phenylenediamine, and N,N-dihydroxyethyl-p-phenylenediamine.

Some naphthols and phenols useful in producing the blue dyes include alpha-naphthol, 1-nitroso-2-naphthol, 7-amino-1-naphthol, and meta aminophenol.

Alpha-naphthol has been found to react to the p-phenylenediamines to give blue dyes at autoclaving temperatures above 212° F. There is some difference in the dye density produced under the various autoclaving conditions, but the difference in hue in general is not great. The azomethine dye reactions with alpha-naphthol are thus useful for indicating that an article has been subjected to moist heat. The dye reactions with an alpha-naphthol are not fully satisfactory for indicating the degree of heat or temperature obtained.

The 1-nitroso-2-naphthol reacts with the p-phenylenediamines to give dyes of different hues at different autoclaving conditions; for example, a coating of the indicator of the present invention (including of course the vehicle) is originally yellow. After autoclaving for fifteen minutes at 212° F., the coating is tan; after three minutes at 240° F., it is brown; and after fifteen minutes at 240° F., a purple color is produced. Dry heating for comparable periods of time and temperature does not cause these color changes. Meta aminophenol reacts with the p-phenylenediamines to give dyes of different colors at different autoclaving temperatures. A coating of the indicator of the present invention is originally light yellow or practically colorless. After autoclaving for fifteen minutes at 212° F., it is a blue gray color. After autoclaving for fifteen minutes at 240° F., however, it is a violet color. Dry heat for comparable periods and temperatures does not cause a color change.

The pyrazolones used in producing the magenta dyes may include 3-methyl-1-phenyl-5-pyrazolone, 1-p-nitrophenyl-3-methyl-5-pyrazolone and 1-p-phenoxy phenyl-3-ethyl-5-pyrazolone. These dyes operate as sterilization indicators somewhat different than those producing the blue dyes. In general the dyes with the pyrazolones are not heat stable and as heat indicators there is required an excess of the p-phenylenediamines so as to produce a red dye immediately upon admixture with the pyrazolones. When a coating of this composition is applied to aluminum and subjected to autoclaving conditions, the red dye color is destroyed, leaving a light brown color, the formation of which is an indication of sterilization.

Acetoacetic ester derivatives employed in forming yellow dyes of the azomethine type may include ethyl acetoacetate, and acetoacet-2-chloroanilide. These combinations in the composition of the present invention with p-phenylenediamines produce a yellow dye at sterilizing temperatures.

The sterilization indicators of the present invention, together with various further objects and advantages of the invention will be more completely understood from the following description of the preferred examples of the invention.

In producing the indicator of the present invention, one of the aforementioned paraphenylene diamines or substituted p-phenylenediamines and a color-forming substance usually characterized by the possession of an active methylene group, such as the naphthols, pyrazolones and acetoacetic ester derivatives mentioned are dispersed in a vehicle.

There is employed in producing the composition not only the substance which couples to produce the dye and the vehicle, but generally there is also employed an additional solvent, which solvent is subsequently evaporated when the composition is applied as a coating. In some cases an oxidizing agent may be employed in the composition, such as barium peroxide. In other cases an agent to increase the rate of water penetration may be employed, such as urea. In general, to control the dye formation (or destruction) so the same will occur coincident with sterilization conditions, the selection and utilization of the proper type of vehicle and ratio of vehicle to dye-forming constituents is required. The vehicle found most satisfactory is either methyl methacrylate resin, such as Acryloid A101 made by Rohm & Haas Co., or a clear nitrocellulose lacquer.

To 100 parts by weight of the dry resin vehicle there should be employed from 1 to 100 parts of the dry dye-forming ingredients. For example, for each 100 parts by weight of resin there may be employed from 0.25 to 25 parts by weight of para-phenylenediamine or substituted para-phenylenediamine, and from 0.75 to 75 parts by weight of the reactant for forming azomethine dyes therewith. In order to facilitate admixture of the ingredients with the vehicle, there is also preferably employed a solvent. Suitable solvents include ketones, such as acetone and methyl ethyl ketone, ethers such as ethyl ether and isopropyl ether, aromatic hydrocarbons, such as benzene, toluene, and xylene, and esters, such as ethyl acetate and butyl acetate.

The solvent may also include alcohols, such as amyl and butyl alcohol, particularly when the alcohols are admixed with some of the other solvents mentioned.

To 100 parts of the dry resin vehicle there is normally employed from 50 to 3000 parts of the solvent in producing the sterilization indicator of the present invention.

In one example of the present invention 100 parts by volume of methyl methacrylate resin solution (40% in methyl ethyl ketone) are mixed with 20 parts by volume of a 7.7% N,N-diethyl-p-phenylenediamine in methyl ethyl ketone and 140 parts by volume of a 4% solution of 1-nitroso-2-naphthol in methyl ethyl ketone. This composition can be applied as a paint or coating to a metal, metal foil, or to some plastics; for example, it might be applied to some portion of the caps of containers utilized for dispensing intravenous solutions or to a piece of foil or plastic to be placed in a sterilizer load of bandages, surgical instruments, canned foods, etc.

The coating, after being applied and dried, is a light yelow brown. This coating shows a distinct difference in color among unsterilized, partially sterilized and completely sterilized samples. Proper sterilizing conditions vary with the material to be sterilized; thus, for example, for some materials sterilization in an autoclave at a temperature of 228° F. for 28 minutes is employed, while for other materials sterilization at 240° F. for 15 minutes is desired.

The indicator of the present invention undergoes no color change with dry heat, even when heated to 248° F. for 15 minutes. When heated at 212° for 14 minutes in an autoclave (an inadequate sterilization) it changes to a chocolate brown. Likewise, when heated to 240° F. for 3 minutes in an autoclave (likewise inadequate for sterilization) it changes to a chocolate brown color, but when heated in an autoclave at 240° F. for 15 minutes, or 228° F. for 28 minutes (either adequate for sterilization), it changes to a purple color.

In the second example of the present invention, 100 parts by volume of methyl methacrylate resin (40% in methyl ethyl ketone) are mixed with 20 parts by volume of 7.7% N,N-diethyl-p-phenylenediamine in methyl ethyl ketone, 140 parts by volume of 4% m-aminophenol in methyl ethyl ketone and 2 parts by weight of barium peroxide. This composition applied as a coating and dried is light yellow or practically colorless and undergoes substantially no change in color on heating up to high temperatures for long periods of time in dry air. It either remains without color change or changes only to a light blue gray in autoclaving under conditions inadequate for sterilization, but under sterilizing conditions changes to a violet color.

In a third example of the present invention, 100 parts by volume of methyl methacrylate resin (40% in methyl ethyl ketone) are admixed with 25 parts of a 5% N,N-diethyl-p-phenylenediamine in methyl ethyl ketone, 72 parts by volume of 8% alpha-naphthol in methyl ethyl ketone, 72 parts by volume of 8% 1-nitroso-2-napthhol in methyl ethyl ketone and 60 parts by volume of a saturated solution of urea in ethyl ether. In this example the urea is found to accelerate or assist in some cases the desired azomethine dye-forming reaction, due probably to an increase in the rate of water penetration into the vehicle. This sterilization indicator is originally green. Under prolonged dry heating it may change to a brown color. Under autoclaving conditions below adequate sterilization it changes to a very light blue gray, but on reaching sterilization conditions it changes to a black.

I claim:

1. An article having applied thereto a sterilization indicator comprising, a coating consisting essentially of a non-reactive, water-insoluble but partially water-permeable resin, a para-phenylenediamine having at least one active amino group, and a reactant for producing an azomethine dye with said para-phenylenediamine, said reactant being selected from the group consisting of naphthols, phenols, pyrazolones, and aceto acetic esters and derivatives thereof an aceto-acetic acid linkage, for each 100 parts by weight of resin there being employed from 0.25 to 25 parts by weight of said para-phenylenediamine, and from 0.75 to 75 parts by weight of said reactant for forming azomethine dyes therewith, said dye-forming constituents being present in sufficient quantity to color said coating upon exposure to steam under sterilizing conditions.

2. The article defined in claim 1 wherein the resin constituent of the coating is methyl methacrylate.

3. The article defined in claim 1 wherein the resin constituent of the coating is a nitrocellulose resin.

4. The article defined in claim 1 wherein the para-phenylenediamine constituent of the coating is N,N-diethyl-p-phenylenediamine.

5. The article defined in claim 1 wherein the reactant in the coating for producing azomethine dye with said para-phenylenediamine comprises 1-nitroso-2-naphthol.

6. The article as defined in claim 1 wherein the reactant in the coating for producing azomethine dye with said para-phenylenediamine is a mixture of 1-nitroso-2-naphthol and α-naphthol.

7. The article defined in claim 1 wherein the reactant in the coating for producing the azomethine dye with said para-phenylenediamine is m-aminophenol.

8. A sterilization indicator composition for formation of a coating on an article to be sterilized, comprising: a non-reactive, water-insoluble but partially water-permeable resin, a para-phenylenediamine having at least one active amino group, a reactant for producing an azomethine dye with said para-phenylenediamine, said reactant being selected from the group consisting of naphthols, phenols, pyrazolones, and aceto acetic esters and derivatives thereof having an aceto-acetic acid linkage, and an organic solvent for at least one of said constituents, for each 100 parts by weight of resin there being employed from 0.25 to 25 parts by weight of said para-phenylenediamine, and from 0.75 to 75 parts by weight of the reactant for forming azomethine dyes therewith, said dye-forming constituents being present in sufficient quantity to color the coating upon exposure to steam under sterilizing conditions.

9. The composition defined in claim 8 wherein the resin constituent is methyl methacrylate.

10. The composition defined in claim 8 wherein the resin constituent is a nitrocellulose resin.

11. The composition as defined in claim 8 wherein the para-phenylenediamine constituent is N,N-diethyl-p-phenylenediamine.

12. The composition defined in claim 8 wherein the reactant for producing an azomethine dye with said para-phenylenediamine comprises 1-nitroso-2-naphthol.

13. The composition as defined in claim 8 wherein the reactant for producing an azomethine dye with said para-phenylenediamine is a mixture of 1-nitroso-2-naphthol and α-naphthol.

14. The composition as defined in claim 8 wherein the reactant for producing an azomethine dye with said para-phenylenediamine is m-aminophenol.

15. The composition as defined in claim 8 including a minor proportion of an oxidizing agent compatible with said constituents and suitable for causing the color change to take place under exposure to steam for a selected period of time and temperature.

16. The composition of claim 8 including a sufficient quantity of urea to accelerate the rate of penetration of moisture in said coating.

17. The composition of claim 8 including a minor proportion of barium peroxide and a sufficient quantity of urea to accelerate the rate of penetration of moisture into said coating.

18. An article having applied thereto a sterilization indicator comprising: a partially water-permeable vehicle selected from the group consisting of methyl methacrylate and nitrocellulose resins; N,N-diethyl-p-phenylenediamine; and a reactant for producing an azomethine dye selected from the group consisting of naphthols, phenols, pyrazolones, and aceto-acetic esters and derivatives thereof having an aceto-acetic acid linkage; for each one hundred parts by weight of resin there being employed from 0.25 to 25 parts by weight of N,N-diethyl-p-phenylenediamine and from 0.75 to 75 parts by weight of the reactant for forming azomethine dyes therewith; said constituents being present in sufficient quantity to color the coating upon exposure to steam at sterilizing conditions.

19. A sterilization indicator composition comprising: a partially water-permeable vehicle selected from the group consisting of methyl methacrylate and nitrocellulose resins; a solvent for said resin; a compound selected from the group consisting of p-phenylenediamine, N,N-diethyl-p-phenylenediamine, N-methyl-p-phenylenediamine, N,N-dimethyl - p - phenylenediamine, N-ethyl-N-hydroxyethyl-p-phenylenediamine, and N,N-dihydroxyethyl-p-phenylenediamine; and a reactant for producing an azomethine dye selected from the group consisting of naphthols, phenols, pyrazolones, and aceto-acetic esters and derivatives thereof having an aceto-acetic acid linkage; for each 100 parts by weight of resin there being employed from 0.25 to 25 parts by weight of p-phenylenediamine compound and from 0.75 to 75 parts by weight of the reactant for forming azomethine dye therewith.

20. A sterilization indicator composition comprising: a polymer of methyl methacrylate; a solvent for said polymer; N,N-diethyl-p-phenylenediamine; and 1-nitroso-2-naphthol; for each 100 parts by weight of resin there being employed approximately four parts by weight of N,N-diethyl-p-phenylenediamine and substantially fourteen parts by weight of 1-nitroso-2-naphthol.

References Cited in the file of this patent

UNITED STATES PATENTS

| | | |
|---|---|---|
| 2,209,087 | Leuch | July 23, 1940 |
| 2,261,473 | Jennings | Nov. 4, 1941 |
| 2,606,654 | Davis | Aug. 12, 1952 |
| 2,681,277 | Morrison | June 15, 1954 |

FOREIGN PATENTS

| | | |
|---|---|---|
| 446,319 | Great Britain | Apr. 28, 1936 |

OTHER REFERENCES

"Synthetic Dyes," 1952, Venkataraman, vol. II, page 1202, Academic Press.